US012767233B2

(12) United States Patent
Kang et al.

(10) Patent No.: US 12,767,233 B2
(45) Date of Patent: Oct. 20, 2026

(54) SIDE SILL ASSEMBLY FOR A VEHICLE

(71) Applicants: HYUNDAI MOTOR COMPANY, Seoul (KR); KIA CORPORATION, Seoul (KR)

(72) Inventors: Seung-Min Kang, Hwaseong-si (KR); Joo-Nam Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 352 days.

(21) Appl. No.: 18/507,625

(22) Filed: Nov. 13, 2023

(65) Prior Publication Data

US 2024/0359747 A1 Oct. 31, 2024

(30) Foreign Application Priority Data

Apr. 25, 2023 (KR) ........................ 10-2023-0054266

(51) Int. Cl.
*B62D 25/02* (2006.01)

(52) U.S. Cl.
CPC .................................. *B62D 25/025* (2013.01)

(58) Field of Classification Search
None
See application file for complete search history.

(56) References Cited

U.S. PATENT DOCUMENTS 8,702,161 B2 * 4/2014 Charbonneau ....... B62D 21/157 296/187.12
11,370,287 B2 * 6/2022 Tsuyuzaki ............ B62D 21/157
12,280,649 B2 * 4/2025 Kang ...................... B62D 21/15
12,448,054 B2 * 10/2025 Carl ..................... H01M 50/249
2013/0257097 A1 * 10/2013 Kojo .................. B62D 25/2036 296/187.08
2022/0017149 A1 * 1/2022 Min ........................ B62D 25/16
2024/0051612 A1 * 2/2024 An ........................ B62D 21/157
2025/0296419 A1 * 9/2025 Danneberg ............... B60K 1/04
2025/0313269 A1 * 10/2025 Saito ...................... B62D 25/20

FOREIGN PATENT DOCUMENTS

KR 970051616 U 9/1997
KR 20220072553 A * 6/2022 ........... B62D 27/065

* cited by examiner

*Primary Examiner* — Aaron L Lembo
(74) *Attorney, Agent, or Firm* — Lempia Summerfield Katz LLC

(57) ABSTRACT

A side sill assembly for a vehicle includes a side sill inner, a side sill outer connected to an outer side of the vehicle from the side sill inner, and a reinforcement member in an internal space between the side sill inner and the side sill outer. The side sill assembly also includes a floor panel having a side end portion connected to the side sill inner. A cross-member is installed on an upper surface of the floor panel in a longitudinal direction of the vehicle, and a connection member connects the cross-member with the side sill inner. A lower end portion of the reinforcement member is positioned within a predetermined length from an upper end portion of the internal space. The connection member is disposed at the same height as an upper surface of the reinforcement member from the ground of a reference height.

18 Claims, 7 Drawing Sheets

SIDE SILL ASSEMBLY FOR A VEHICLE

CROSS-REFERENCE TO RELATED APPLICATION

This application claims priority to Korean Patent Application No. 10-2023-0054266, filed on Apr. 25, 2023, which is incorporated herein by reference in its entirety.

BACKGROUND

Field of the Disclosure

The present disclosure relates to a side sill assembly for a vehicle, and more particularly to a side sill assembly for a vehicle that dissipates collision energy for preventing damage to a battery installed on a floor panel in the event of side collision.

Description of Related Art

FIGS. 1 and 2 illustrate a floor structure of a vehicle to which a side sill according to the related art is applied.

A side sill 110 is provided on a lower portion of a lateral side of a vehicle and extends in a longitudinal direction of the vehicle. The side sill 110 is formed by joining an inner portion of a side sill, i.e., a side sill inner 111 and an outer portion of a side sill, i.e., a side sill outer 112. An extruded material 113 made of an aluminum alloy material for reinforcement is provided between the side sill inner 111 and the side sill outer 112. The side sill inner 111 is connected to a side end portion of a floor panel 121. A cross-member 122 is disposed in a width direction of the vehicle and is provided on the floor panel 121 and an end portion of the cross-member 122 is coupled to the side sill inner 111 through a connection member 123. The cross-member 122 has a cross section formed in an "M" shape or a "W" shape to support a collision load transmitted in a width direction of the vehicle in the event of side collision.

Meanwhile, in electric vehicles, a battery is mounted on a lower portion of the floor panel 121. To install the battery, a battery mounting bolt (not shown) is fastened to the cross-member 122. Or a battery side frame 131 is provided at a side of the battery, and then the battery side frame 131 and the side sill 110 are fastened using the battery mounting bolt.

In the event of side collision of a vehicle, a load path into which a collision load is transmitted is formed through upper and lower portions of the side sill 110. In particular, since the battery mounting bolt is fastened to a battery mount 132 formed on the side sill inner 111, the battery may be damaged by the collision load transmitted to the lower portion of the side sill 110. Since the connection member 123 and the cross-member 122 are not disposed or arranged on the same line, a load supported by the upper portion of the side sill 110 may be limited. Thus, as a load concentrated to the lower portion of the side sill 110 increases, damage to the battery increases, accordingly.

In particular, to increase a maximum traveling distance after one full charge, a capacity of the battery gradually increases, and a cross section of the side sill 110 is reduced for securing a battery mounting space. Accordingly, a stiffness of the side sill 110 becomes weakened and there is a possibility that the battery is severely damaged in the event of side collision.

Meanwhile, when an extruded material for resisting a collision load is applied inside the side sill 110, there is a tendency of increasing a stiffness of a vehicle body and decreasing a stiffness of a battery side frame in order to properly balance an impact load between the vehicle body and the battery side frame in the event of side the collision. However, as the stiffness of the battery side frame increases, the stiffness of the vehicle body further increases for load balancing, thereby increasing a weight of the vehicle body. Due to the increase in the weight of the vehicle body, power efficiency and manufacturing costs become unfavorable.

SUMMARY

The present disclosure provides a side sill assembly for a vehicle. The side sill unifies a load path of a load input through a side surface in the event of side collision of a vehicle to an upper portion of a side sill. Thus, an extruded material provided therein is deformed to absorb a collision load and prevents the extruded material deformed in the event of side collision and a battery from being fastened or joined to each other.

In order to achieve the object, a side sill assembly for a vehicle according to the present disclosure includes a side sill inner, a side sill outer connected to the side sill inner, and a reinforcement member provided between the side sill inner and the side sill outer. The side sill assembly also includes a floor panel having a side end portion connected to the side sill inner, a cross-member installed on the floor panel in a width direction of the vehicle, and a connection member connecting the cross-member with the side sill inner. A lower end portion of the reinforcement member may be positioned within a predetermined length from an upper end portion of an internal space formed between the side sill inner and the side sill outer. The connection member may be disposed at the same height as an upper surface of the reinforcement member from the ground or a reference height.

There may be a predetermined distance between an end portion of the cross-member and the side sill inner. The connection member may connect the upper surface of the cross-member with a side surface of the side sill inner.

The connection member may connect the upper surface of the cross-member with a side surface of the side sill. A seat rail may be installed on the connection member.

The cross-member may include one or more convex portions and one or more concave portions repeated and alternatingly formed to extend in a longitudinal direction of the vehicle.

A flange portion is formed at the ends cross-member and connected to the floor panel in the longitudinal direction of the vehicle and the one or more concave portions and the flange portion may be bonded to the floor panel.

A seat mounting bracket may connect an upper surface of the side sill inner with the cross-member and may be further provided upward from the connection member.

A seat rail may be installed on the seat mounting bracket.

A battery mount, to which a battery side frame is fastened, may be installed on a lower surface of the side sill inner and an upper end portion of the battery mount may be spaced apart from a lower surface of the reinforcement member.

The reinforcement member may be bonded to an inner surface of the side sill inner with an adhesive.

The reinforcement member may be fastened to an inner surface of the side sill inner with a fastening bolt.

A support may be fixed to an inner surface of the side sill inner and may be configured to support a lower surface of the reinforcement member.

The reinforcement member may be formed by extrusion and a rib may be formed in a height direction of the vehicle.

Also, in order to achieve the above object, a side sill assembly for a vehicle according to the present disclosure includes a side sill inner, a side sill outer connected to an outer side of the vehicle from the side sill inner, and a reinforcement member provided in an internal space between the side sill inner and the side sill outer. The side sill assembly also includes a floor panel having a side end portion connected to the side sill inner, a cross-member installed on an upper surface of the floor panel in a width direction of the vehicle, and a connection member connecting the cross-member with the side sill inner. A lower end portion of the reinforcement member may be positioned within a predetermined length from an upper end portion of the internal space. The connection member and an upper surface of the reinforcement member may be disposed on the same virtual straight extension line to support the reinforcement member.

Further, in order to achieve the above object, a side sill assembly for a vehicle according to the present disclosure includes a side sill inner, a side sill outer connected to an outer side of the vehicle from the side sill inner, a reinforcement member provided in an internal space between the side sill inner and the side sill outer. The side sill assembly also includes a floor panel having a side end portion connected to the side sill inner, a cross-member installed on an upper surface of the floor panel in a width direction of the vehicle, and a connection member connecting the cross-member separated from an end portion of the connection member with the side sill inner. A lower end portion of the reinforcement member may be positioned within a predetermined length from an upper end portion of the internal space. The connection member and the upper surface of the reinforcement member may be disposed at the same height from the ground or a reference height in a row in order to support the reinforcement member.

According to the side sill assembly for a vehicle of the present disclosure having the above configurations, the battery side frame and the reinforcement member formed by extrusion are not connected to each other. Thus, the load path to which collision energy may be input in the event of side collision is unified to the upper portion of the side sill.

By unifying the load path and arranging the connection member and the cross-member on the same line, it is possible to allow the collision load to be concentrated on deforming the reinforcement member, thereby preventing damage to the battery.

In addition, the collision load remaining after deforming the reinforcement member can support the connection member and the cross-member.

Therefore, it is possible to prevent the phenomenon where the upper portion of the side sill may be rotated or bent toward the inside of the vehicle and enter the inside of the vehicle, thereby reducing the risk of injury to passengers.

In addition, it is not necessary to excessively increase the stiffness of the vehicle body according to the increase in the stiffness of the battery.

DESCRIPTION OF SPECIFIC EMBODIMENTS

Figure 1:
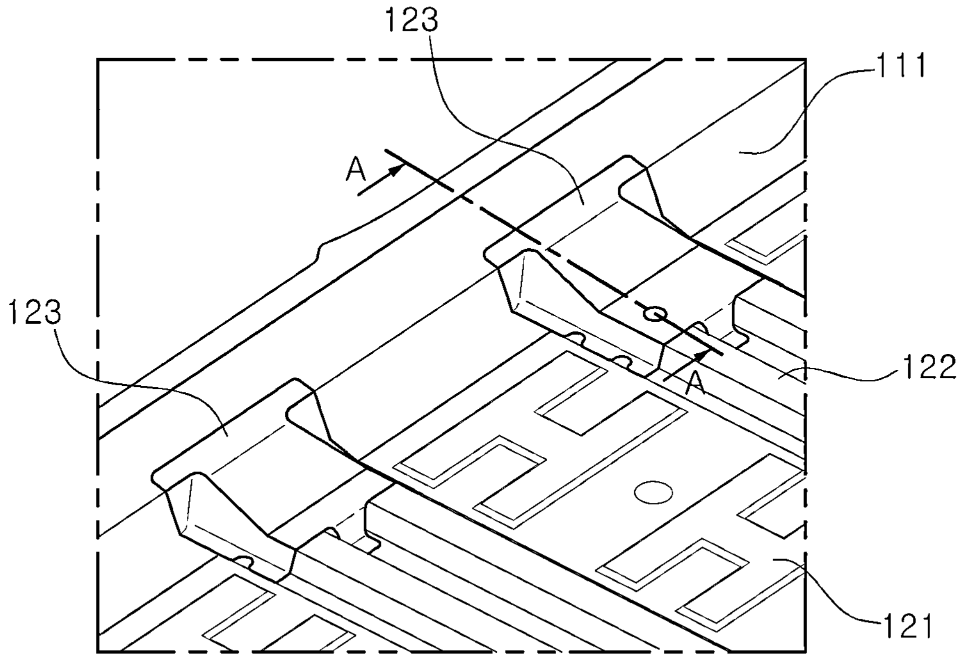
FIG. 1 (Prior Art)
FIG. 1 is a perspective view illustrating a portion of a vehicle in which a side sill according to the related art is connected to a floor panel.
Figure 2:
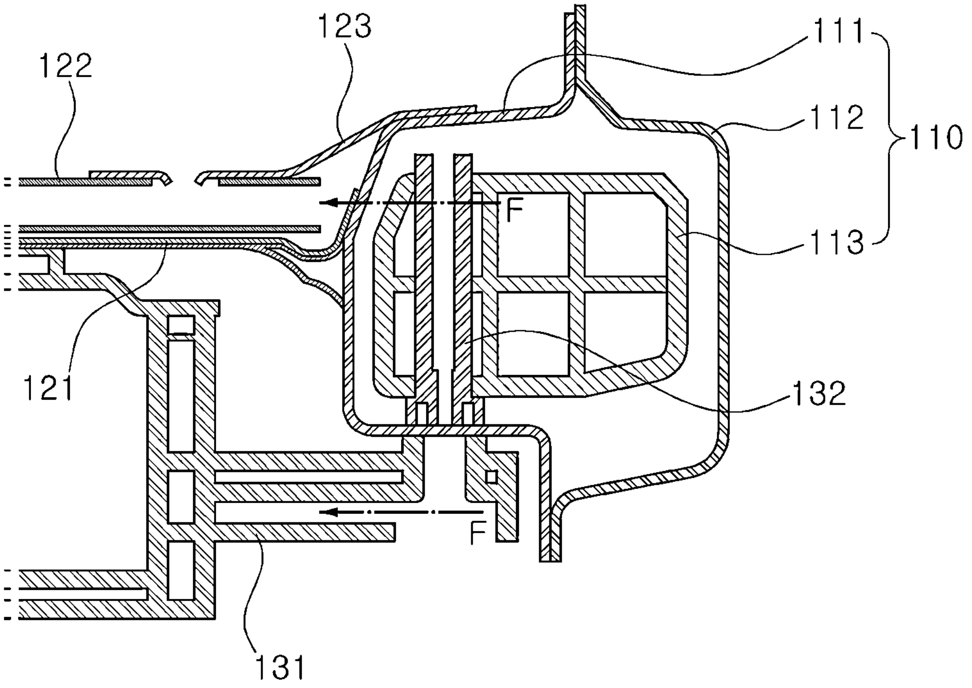
FIG. 2 (Prior Art)
FIG. 2 is a cross-sectional view of the vehicle portion taken along line A-A in FIG. 1.
Figure 3:
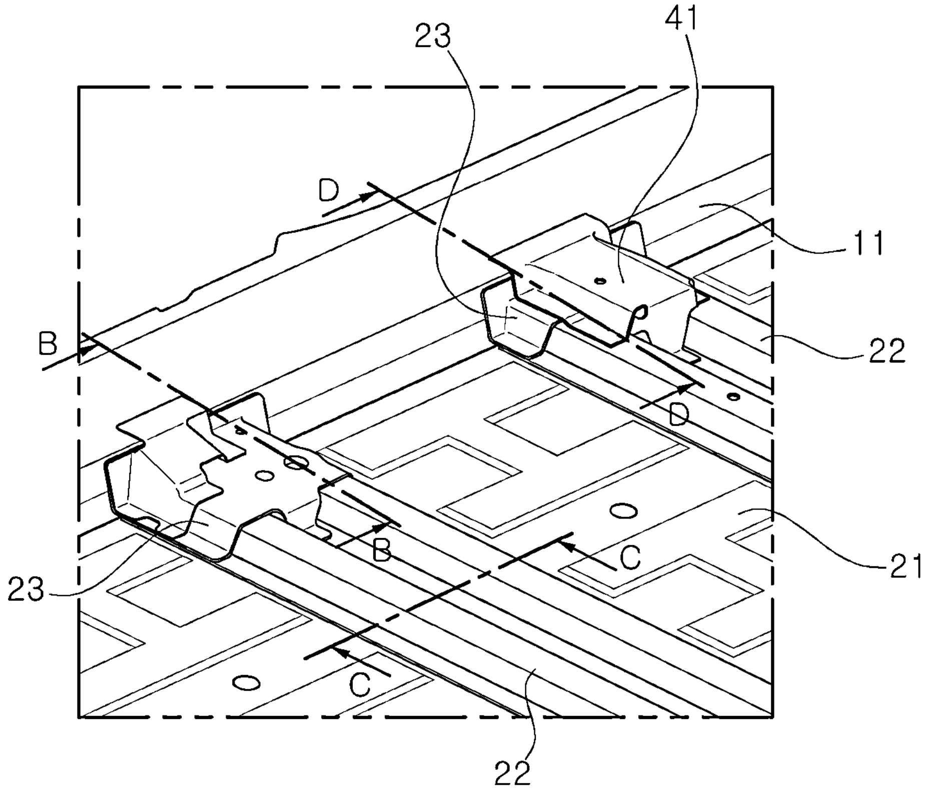
FIG. 3 is a perspective view illustrating a portion of a vehicle in which a side sill assembly for a vehicle according to one embodiment of the present disclosure is connected to a floor panel.
Figure 4:
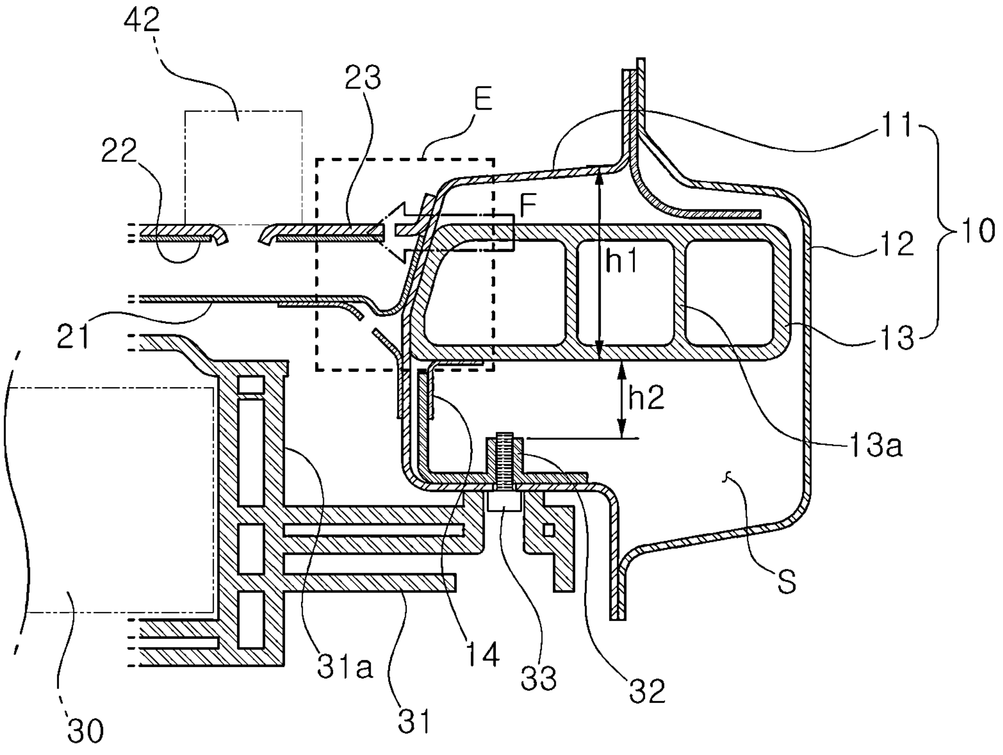
FIG. 4 is a cross-sectional view of the vehicle portion along line B-B in FIG. 3.

Hereinafter, a side sill assembly for a vehicle according to the present disclosure is described in detail with reference to the accompanying drawings. When a component, device, element, or the like of the present disclosure is described as having a purpose or performing an operation, function, or the like, the component, device, or element should be considered herein as being "configured to" meet that purpose or perform that operation or function. When a component is referred to as being "connected" to or "in contact" with another component, it should be understood that it may be directly connected to or in contact with the other component, but other components may exist therebetween. On the other hand, when a component is referred to as being "directly connected" to or "directly in contact" with another component, it should be understood that there is no other component therebetween.

A side sill assembly 10 for a vehicle according to the present disclosure may include an inner part of a side sill, i.e., a side sill inner 11 and an outer part of a side sill, i.e., a side sill outer 12 connected to an outer side of the vehicle from the side sill inner 11. The side sill assembly 10 may also include a reinforcement member 13 provided in an internal space S between the side sill inner 11 and the side sill outer 12, a floor panel 21 having a side end portion connected to the side sill inner 11, a cross-member 22 installed on an upper surface of the floor panel 21 in a width direction of the vehicle, and a connection member 23 connecting the cross-member 22 with the side sill inner 11. A lower end portion of the reinforcement member 13 may be positioned within a predetermined length h1 from an upper end portion of the internal space S. The connection member 23 may be disposed at the same height as an upper surface of the reinforcement member 13 from a reference height, such as the ground, in order to support the reinforcement member 13.

In the side sill assembly 10, the side sill inner 11 and the side sill outer 12 may be convexly formed toward inner and outer sides of the vehicle, respectively. The side sill assembly 10 may be configured by bonding upper and lower end portions of the side sill inner 11 and the side sill outer 12 so that the internal space S is formed therebetween extending in a longitudinal direction of the vehicle.

The side sill assembly 10, which is a structure extending in the longitudinal direction of the vehicle, may be formed on a lower portion of a side surface of the vehicle by the side sill inner 11 and the side sill outer 12.

The reinforcement member 13 may be provided in the internal space S between the side sill inner 11 and the side sill outer 12. The reinforcement member 13 may be formed by extrusion using an aluminum alloy material. The reinforcement member 13 has a rib or multiple ribs 13*a* formed therein in a height direction of the vehicle to improve stiffness. In the event of side collision, the rib or ribs 13*a* of the reinforcement member 13 may absorb a collision load.

In the present disclosure, the reinforcement member 13 may be positioned on an upper portion of the internal space S between the side sill inner 11 and the side sill outer 12. In other words, a lower surface of the reinforcement member 13 may be positioned within a predetermined length h1 from an upper end portion of the internal space S and within the internal space S.

Since the reinforcement member 13 is positioned on the upper portion of the internal space S, a load path may be formed so that the collision load is transmitted to the cross-member 22 through the upper portion of the side sill assembly 10 in the event of side collision.

The reinforcement member 13 may be bonded to an inner surface of the side sill inner 11 with an adhesive 15.

In addition, the lower surface of the reinforcement member 13 may be supported by a support 14 that is fixed to the inner surface of the side sill inner 11.

A side end portion of the floor panel 21 may be connected to the side sill inner 11.

The cross-member 22 may be installed on the upper surface of the floor panel 21 and may be disposed in the width direction of the vehicle. The cross-member 22 may be one of multiple members for transmitting a load input in a transverse direction of the vehicle.

The cross-member 22 may be formed so that a convex portion 22*a* and a concave portion 22*b* are alternatingly repeated in the longitudinal direction of the vehicle. The cross-member 22 may include one or more of the convex portions 22*a* and/or one or more of the concave portions 22*b*. As in the illustrated example, the cross-member 22 may have a substantially "M" or "W" shaped cross section depending on the number of convex portions 22*a* and the number of concave portions 22*b*. Here, the cross-member 22 has one concave portion 22*b* and two convex portions 22*a*. Since the cross-member 22 is formed in a M or W-shaped cross section and is disposed in the width direction of the vehicle, the cross-member 22 may support the load input in the transverse direction of the vehicle. In other words, since a portion connecting the convex portions 22*a* with the concave portion 22*b* serves as a rib, the cross-member 22 on which the convex portions 22*a* and the concave portion 22*b* are formed may support a collision load that is input by a side collision.

In addition, a flange portion 22*c* may be formed on each of a front and a rear of the cross-member 22. The flange portions 22*c* may be connected to the floor panel 21 from the upper surface and relative to each of a front and rear of the vehicle in the longitudinal direction. The cross-member 22 may be bonded to the floor panel 21 through the concave portion 22*b* and the flange portions 22*c*.

The cross-member 22 may be formed in a single layer structure. In other words, the conventional cross-member may be formed in a double-layer structure of upper and lower cross-members, but the cross-member 22 may be similar to only the conventional upper cross-member and may be connected to the floor panel 21. When the cross-member 22 is formed in a single layer structure, it is possible to minimize the number of factors contributing to deformation in the event of side collision compared to the double-layer structure. This is for simplifying the load path and inducing deformation as intended. However, since the cross-member 22 is formed of only the single layer structure, an increased strength of the cross-member 22 may be applied compared to the related art.

The cross-member 22 may be used to fasten a portion with a circumference of a battery 30 of an electric vehicle through the side sill inner 11. In other words, a battery mounting bolt 33 may be fastened to a battery side frame 31 of the battery 30 and a battery mount 32 which is installed on the side sill inner 11 so that the battery 30 is mounted below the floor panel 21.

In order to assemble the cross-member 22 with the side sill inner 11, a predetermined distance g may be formed between an end portion of the cross-member 22 and the side sill inner 11.

The connection member 23 may connect the cross-member 22 with the side sill inner 11.

Figure 5:
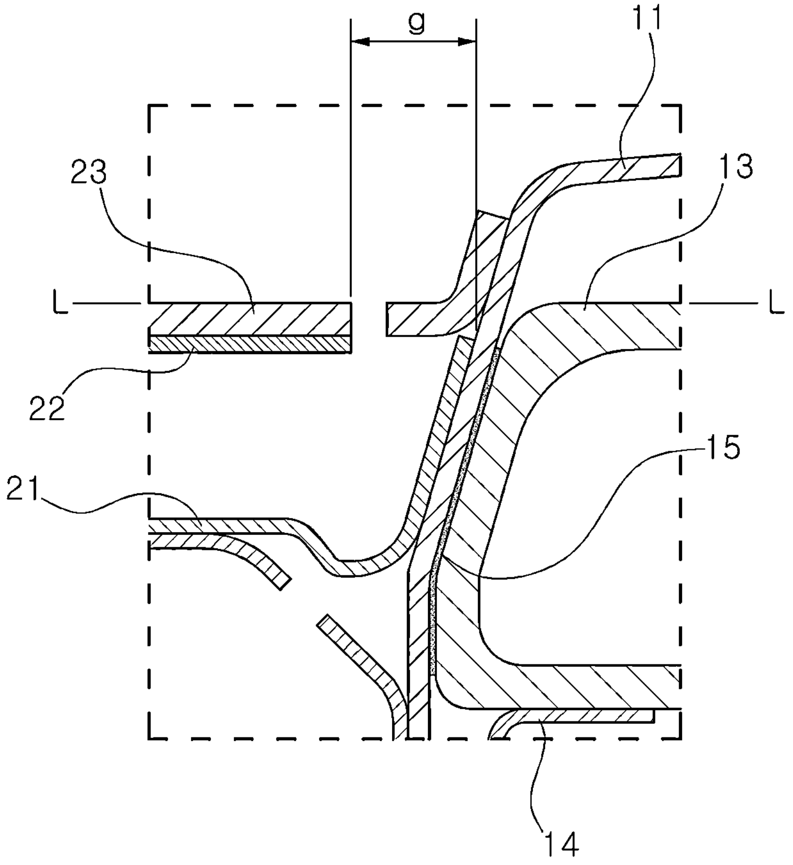
FIG. 5 is an enlarged view of the cross-section in the portion E of FIG. 4.
Figure 6:
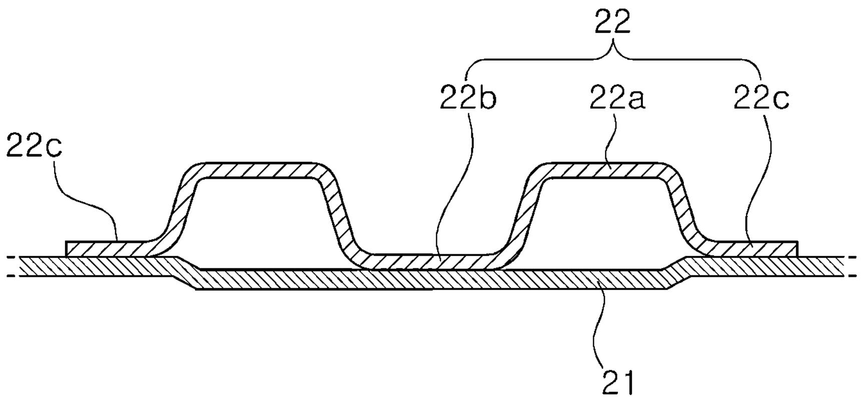
FIG. 6 is a cross-sectional view of the vehicle portion taken along line C-C in FIG. 3.

The connection member 23 connects the cross-member 22, which is separated from an end portion of the connection member 23 at a distance g, with the side sill inner 11 as shown in FIG. 5. In this case, the connection member 23 may be positioned at the same height as the reinforcement member 13 relative to a reference height, such as from the ground. In other words, referring to FIG. 5, an upper surface of the connection member 23 and an upper surface of the reinforcement member 13 may be positioned on line L-L. Therefore, the upper surfaces of the connection member 23 and the reinforcement member 13 may be disposed on the same virtual straight extension line. Thus, the upper surfaces of the connection member 23 and the reinforcement member 13 may be positioned in a row. Since the connection member 23 and the reinforcement member 13 are formed at the same height so that the side sill assembly 10 and the cross-member 22 are connected at the upper portion of the side sill assembly 10 that is a limited range, a transverse load, i.e., a load input in the event of side collision, may be transmitted to the cross-member 22. Therefore, in the event of side collision, the collision load may be transmitted to a load path F consecutively formed in a lateral or vehicle width direction by the upper portion of the side sill assembly 10, the connection member 23, and the cross-member 22.

Since the connection member 23 also serves as a seat mount for mounting a seat, a seat rail 42 may be installed on the connection member 23.

Meanwhile, in the event of side collision, the collision load F may be transmitted only to the load path as described above, and the load path may be not formed on the lower portion of the side sill assembly 10. Therefore, by simplifying the load path toward the upper portion of the side sill assembly 10 so that a structure capable of supporting or absorbing the collision load F is formed on the load path, it is possible to prevent the upper portion of the side sill assembly 10 from entering into or being bent to the inside of the vehicle due to the collision load F.

In addition, an upper end portion of the battery mount 32 may be spaced by a gap h2 from the lower surface of the reinforcement member 13. Thus, the battery mount 32 for mounting the battery 30 of the electric vehicle is not connected to the reinforcement member 13. In addition, it may be advantageous that the gap h2 is adjacent to an upper end portion of a side wall 31*a* of the battery side frame 31 to induce the collision load input to the side surface of the vehicle to be concentrated on the cross-member 22. Therefore, since the collision load is not transmitted through the battery mount 32, it is possible to prevent damage to the battery 30 in the event of side collision.

The battery 30 may be fixed to a frame or the like in order to be mounted on the vehicle, and the frame may be fastened to the vehicle. Both end portions of the battery 30 may be fixed to the battery side frame 31, and the battery side frame 31 may be fastened to the side sill assembly 10. Thus, a side end portion of the battery 30 may be fastened to the side sill assembly 10. In the side sill assembly 10, the battery mount 32 may be installed on the side sill inner 11, and the battery side frame 31 may be fastened to the battery mount 32 using the mounting bolt 33.

In this case, in the side sill assembly 10, the battery mount 32 and the reinforcement member 13 may be not connected so that the load path is formed only on the upper portion of the side sill assembly 10 and a load path is not formed on the lower portion thereof. Since the battery mount 32 and the reinforcement member 13 are not connected and the upper end portion of the battery mount 32 and the lower end portion of the reinforcement member 13 are spaced by a predetermined distance from each other, the collision load F may be concentrated on the upper portion in the event of side collision. Therefore, most of the collision load F in the event of a side collision is consumed in deforming the reinforcement member 13. Since the collision load transmitted toward the battery side frame 31 is relatively small, deformation of the battery side frame 31 may be relatively reduced, thereby preventing significant damage to the battery 30 in the event of side collision.

Therefore, in the event of side collision of the vehicle, the collision load F may be concentrated on the upper portion of the side sill assembly 10. The collision load F may be input to the reinforcement member 13 through the side sill outer 12 and transmitted to the cross-member 22 through the connection member 23. At this time, as the reinforcement member 13 is deformed, a part of the collision load F may be eliminated or dissipated, and the cross-member 22 supports the collision load transmitted through the connection member 23.

In addition, since the reinforcement member 13 is not connected to the battery mount 32 and thus the battery side frame 31 is not moved to the reinforcement member 13, the deformation of the battery side frame 31 may be less, i.e., reduced. Since the deformation of the battery side frame 31 is negligibly small, it is possible to reduce or prevent damage to the battery 30 in the event of side collision.

Figure 7:
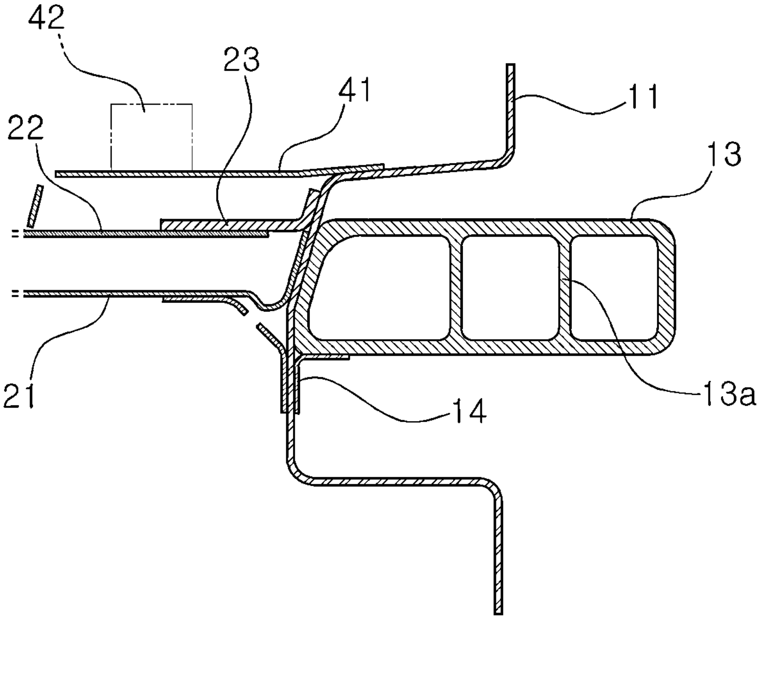
FIG. 7 is a cross-sectional view of the vehicle portion taken along line D-D in FIG. 3.

Meanwhile, the connection member 23 also may serve as a seat mount for mounting the seat. When the seat is not mounted on the connection member 23 due to the layout of the vehicle, as illustrated in FIG. 7, the seat may be mounted by separately installing a seat mounting bracket 41 connecting the side sill inner 11 with the cross-member 22 upward from the connection member 23 and installing the seat rail 42 on the seat mounting bracket 41.

Since this structure allows the connection member 23 to maintain the same height as the reinforcement member 13 so that the load input in the transverse direction is transmitted to the cross-member 22, the cross-member 22 may support the load that is input by a side collision.

Figure 8:
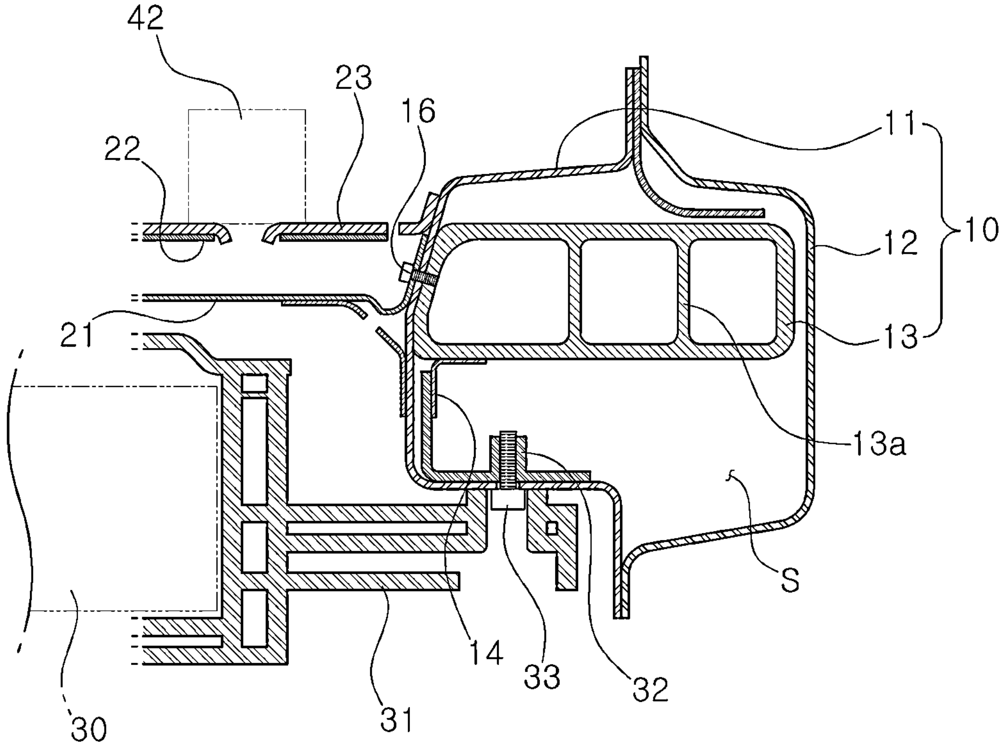
FIG. 8 is a cross-sectional view illustrating a side sill assembly for a vehicle according to another embodiment of the present disclosure.

FIG. 8 illustrates a configuration in which the reinforcement member 13 may be fastened to the side sill inner 11 using hardware, such as a fastening bolt 16.

In other words, the same configuration as the above-described side sill assembly 10 may be provided, but the fastening method between the side sill inner 11 and the reinforcement member 13 may be different. Thus, the side sill inner 11 and the reinforcement member 13 may be fastened to each other using the fastening bolt 16 instead of the adhesive 15.

What is claimed is:

1. A side sill assembly for a vehicle, the side sill assembly comprising:

a side sill inner;

a side sill outer connected to the side sill inner;

a reinforcement member provided between the side sill inner and the side sill outer;

a floor panel having a side end portion connected to the side sill inner;

a cross-member installed on the floor panel in a width direction of the vehicle; and a connection member connecting the cross-member with the side sill inner, wherein a lower end portion of the reinforcement member is positioned within a predetermined length from an upper end portion of an internal space formed between the side sill inner and the side sill outer, wherein the connection member is disposed at the same height as an upper surface of the reinforcement member from a reference height, wherein the cross-member includes one or more convex portions and one or more concave portions repeated and alternatingly extending in a longitudinal direction of the vehicle, and wherein an upper surface of the connection member is positioned at the same height as the upper surface of the reinforcement member relative to a reference height.

2. The side sill assembly of claim 1, wherein there is a predetermined distance between an end portion of the cross-member and the side sill inner.

3. The side sill assembly of claim 1, wherein the connection member is configured to connect the upper surface of the cross-member with a side surface of the side sill inner, and wherein a seat rail is installed on the connection member.

4. The side sill assembly of claim 1, wherein the cross-member has a flange portion connected to the floor panel and extending in the longitudinal direction of the vehicle, and wherein the one or more concave portions and the flange portion are bonded to the floor panel.

5. The side sill assembly of claim 1, further comprising a seat mounting bracket, upward from the connection member, connecting an upper surface of the side sill inner with the cross-member.

6. The side sill assembly of claim 5, wherein a seat rail is installed on the seat mounting bracket.

7. The side sill assembly of claim 1, wherein a battery mount, to which a battery side frame is fastened, is installed on a lower surface of the side sill inner, and wherein an upper end portion of the battery mount is spaced apart from a lower surface of the reinforcement member.

8. The side sill assembly of claim 1, wherein the reinforcement member is bonded to an inner surface of the side sill inner with an adhesive.

9. The side sill assembly of claim 1, wherein the reinforcement member is fastened to an inner surface of the side sill inner with a fastening bolt.

10. The side sill assembly of claim 1, wherein a support is fixed to an inner surface of the side sill inner and is configured to support a lower surface of the reinforcement member.

11. The side sill assembly of claim 1, wherein the reinforcement member is extruded and has a rib in a height direction of the vehicle.

12. A side sill assembly for a vehicle, the side sill assembly comprising:
a side sill inner;
a side sill outer connected to an outer side of the vehicle from the side sill inner;
a reinforcement member in an internal space between the side sill inner and the side sill outer;
a floor panel having a side end portion connected to the side sill inner;
a cross-member installed on an upper surface of the floor panel in a width direction of the vehicle; and
a connection member connecting the cross-member separated from an end portion of the connection member with the side sill inner,
wherein a lower end portion of the reinforcement member is positioned within a predetermined length from an upper end portion of the internal space,
wherein the connection member and an upper surface of the reinforcement member are disposed on the same virtual straight extension line to support the reinforcement member,
wherein the cross-member includes one or more convex portions and one or more concave portions repeated and alternatingly extending in a longitudinal direction of the vehicle, and
wherein an upper surface of the connection member is positioned at the same height as the upper surface of the reinforcement member relative to a reference height.

13. The side sill assembly of claim 12, wherein there is a predetermined distance between an end portion of the cross-member and the side sill inner.

14. The side sill assembly of claim 12, wherein
the reinforcement member is bonded to an inner surface of the side sill inner with an adhesive.

15. The side sill assembly of claim 12, wherein a seat mounting bracket is installed upward from the connection member and connects an upper surface of the side sill inner with the cross-member.

16. A side sill assembly for a vehicle, the side sill assembly comprising:
a side sill inner;
a side sill outer connected to an outer side of the vehicle from the side sill inner;
a reinforcement member in an internal space between the side sill inner and the side sill outer;
a floor panel having a side end portion connected to the side sill inner;
a cross-member installed on an upper surface of the floor panel in a width direction of the vehicle;
a connection member connecting the cross-member with the side sill inner; and
a seat mounting bracket, upward from the connection member, connecting an upper surface of the side sill inner with the cross-member,
wherein the connection member connects the upper surface of the cross-member with a side surface of the side sill inner,
wherein a lower end portion of the reinforcement member is positioned within a predetermined length from an upper end portion of the internal space,
wherein the connection member and the upper surface of the reinforcement member are disposed at the same height in a row to support the reinforcement member,
wherein the cross-member includes one or more convex portions and one or more concave portions repeated and alternatingly extending in a longitudinal direction of the vehicle, and
wherein an upper surface of the connection member is positioned at the same height as the upper surface of the reinforcement member relative to a reference height.

17. The side sill assembly of claim 16, further comprising a predetermined distance between an end portion of the cross-member and the side sill inner.

18. The side sill assembly of claim 16, wherein a battery is mounted below the floor panel by a battery mounting bolt fastened to a battery side frame of the battery and a battery mount installed on the side sill inner.

* * * * *